Patented Dec. 19, 1933

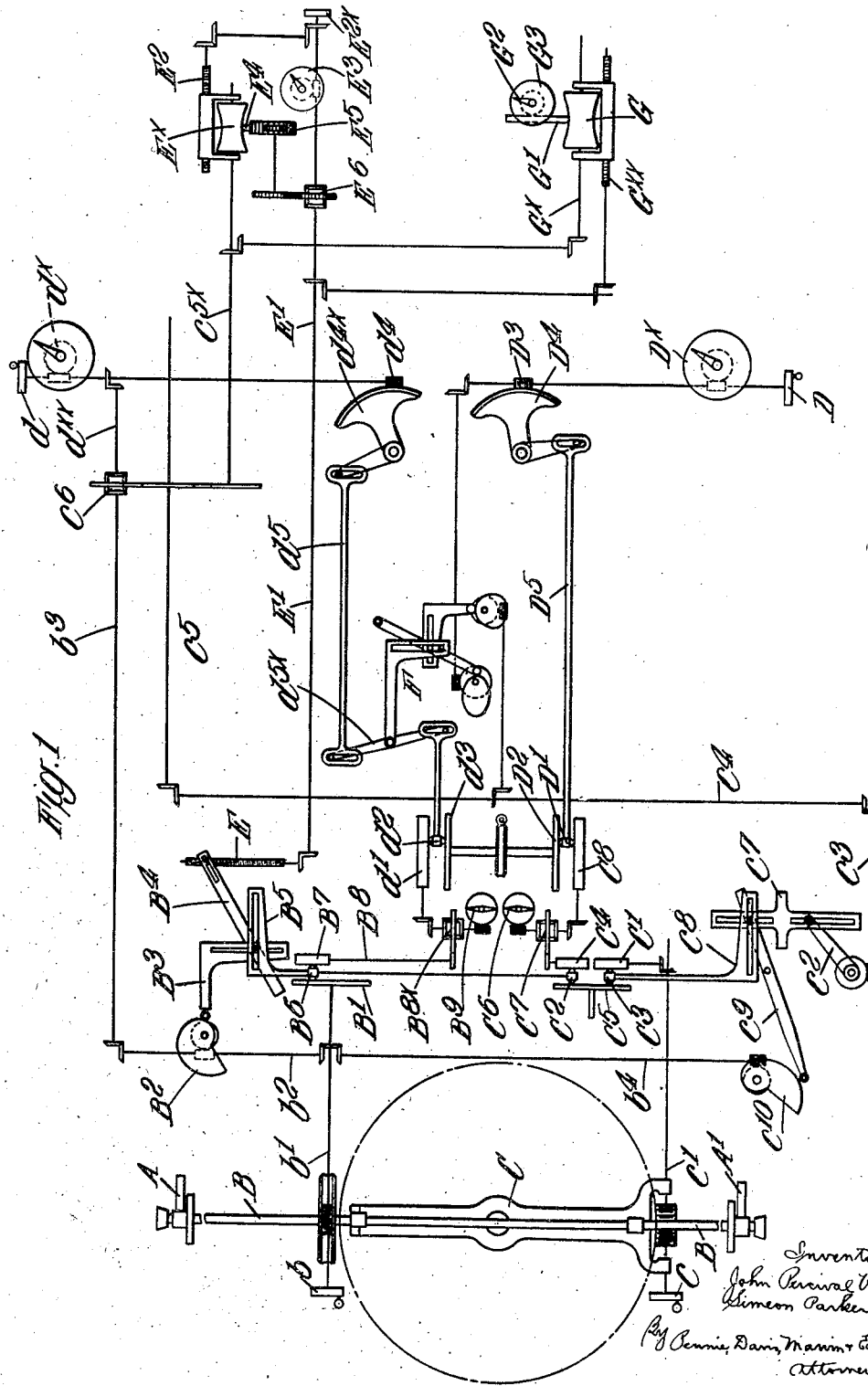

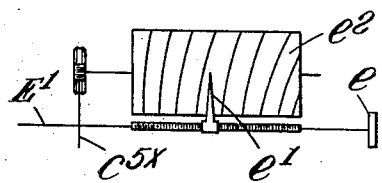
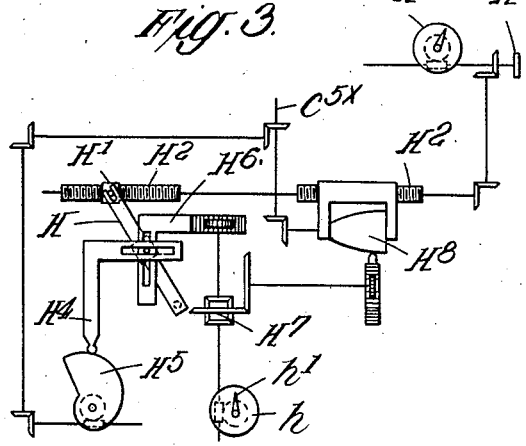

1,940,518

UNITED STATES PATENT OFFICE 1,940,518

APPARATUS FOR USE IN THE FIRE CONTROL OF ANTIAIRCRAFT GUNS

John Percival Watson and Simeon Parker, Westminster, England, assignor to Vickers-Armstrongs Limited, Westminster, England, a British Company Application February 18, 1932, Serial No. 593,836, and in Great Britain March 16, 1931

5 Claims. (Cl. 235—61.5)

This invention relates to apparatus for use in the fire-control of anti-aircraft guns the said apparatus comprising a calculator which, when properly adjusted, computes the correct vertical deflection and the correct horizontal or lateral deflection from the various factors involved. The invention particularly relates to apparatus of the type forming the subject of English Patent No. 236,250 and the chief object is to obtain improved results and provide means for dealing with increased speeds of aerial targets with less limitations in a simple and improved manner.

The improved apparatus is so constructed as to derive the vertical and lateral deflections from the following equations:—

$$\sin d = R_E \times (S_T \times \operatorname{cosec} S_p), \text{ and}$$
$$\sin D = R_t \times (S_T \times \operatorname{cosec} S_p) \times \cos S_p \sec S_f$$

where $d$ = vertical deflection $R_E$ = Angular rate of elevation.
$S_T$ = Product of sin $S_f$ and the time of flight,
$S_p$ = Present angle of sight,
$S_f$ = Future angle of sight (i. e. $S_p \pm d$),
$D$ = Lateral deflection in azimuth.
$R_t$ = Angular rate of training in azimuth, and according to the present invention we provide means for utilizing the displacement of a member moving in accordance with $S_T$ for the mechanical interpretion of the highest common factor ($S_T \times \operatorname{cosec} S_p$) in both the above equations, and for utilizing the result in combination with the other factors involved for the determination of the vertical and lateral deflections. The complementary error correction has been omitted from the vertical deflection equation as it may not always be necessary to provide for this, but where more accurate results are required the said equation is modified as follows:—

$$\sin d = R_E \times (S_T \times \operatorname{cosec} S_p) - \sin D \tan \frac{D}{2} \sin S_f \cos s_f.$$

For complete mathematical accuracy sin $S_f$ in the last-mentioned equation should be sin $S_p$ but sin $S_f$ is used in the apparatus as the approximation is very close.

In regard to these equations we would point out that $S_p$ corresponds to $\alpha$ in the equations in the aforesaid earlier patent and $S_T$ corresponds to $T \times \sin(\alpha \pm d)$ in the latter equations.

In order that the said invention may be clearly understood and readily carried into effect the same will now be described more fully with reference to the accompanying drawings, in which:—

Figure 1 is a diagrammatic view of apparatus in accordance with this invention.

Figure 2 is a diagrammatic view of an alternative means for determining $S_T$, and Figure 3 is a diagrammatic view of an alternative means for determining the fuze settings.

Referring to Figure 1, the apparatus comprises an elevating telescope A and a training telescope A¹, connected together by a horizontal shaft B. This horizontal shaft is rotated by the elevating number in order to follow the target in elevation by means of an elevating handle $b$ and is supported in a bracket C rotated by the training number by means of a training handle $c$ in order to follow the target in training. The rotation of the elevating handle $b$ in keeping the telescope A on the target is therefore proportionate to $R_E$ and its angular position is proportionate to $S_p$. A shaft $b^1$ driven by the handle $b$ is geared to other shafts $b^2$, $b^3$, $b^4$ all of which moves proportionately to $S_p$ and the said shaft $b^1$ also drives a disc $B^1$ proportionately to $R_E$ for the purpose hereinafter described. The handle $c$ operates a shaft $c^1$ which drives a roller $C^1$ proportionately to $R_T$ also for the purpose hereinafter described. The shaft $b^2$ drives a cam $B^2$ which displaces a sliding member $B^3$ by an amount proportionate to cosec $S_p$, this member forming with a pivoted arm $B^4$ (which is displaced in the manner hereinafter described in accordance with $S_T$) a multiplying linkage giving movement to a sliding member $B^5$ by an amount proportionate to $S_T \times \operatorname{cosec} S_p$. This latter member has a ball carrier $B^6$ movable over the face of the aforesaid disc $B^1$ rotated from the sight elevating handle $b$ in accordance with $R_E$. A roller $B^7$ in contact with the ball is thus driven at a speed proportional to $R_E \times (S_T \times \operatorname{cosec} S_p)$. The shaft $B^8$ of this roller is connected through a differential gear $B^{8x}$ to a pointer $B^9$ and this differential gear is also operated, in order to keep the pointer "balanced", by a roller $d^1$ forming part of a variable speed mechanism driven by a constant speed motor. A ball carrier $d^2$ interposed between this roller and a disc $d^3$ driven by the motor is adjusted by the vertical deflection handle $d$ preferably through a sine gear comprising a worm $d^4$, a worm wheel quadrant $d^{4x}$, a link $d^5$ and a lever $d^{5x}$, so that the rotation of this handle in keeping the pointer $B^9$ "balanced" is a measure of the vertical deflection. This vertical deflection is indicated on a dial $d^x$. When the complementary error is to be corrected (which is necessary if the apparatus is required to give results of the greatest accuracy) the complementary error gear (which is generally similar to that described in the aforesaid earlier specification and is indicated at F) operates to move the fulcrum of the said lever $d^{5\times}$ so that the rotation of the vertical deflection handle $d$ in keeping the pointer $B^9$ "balanced" is thus proportional to:—

$$R_B \times (S_T \times \operatorname{cosec} S_p) - \sin D \tan \frac{D}{2} \sin S_f \cos S_f.$$

For the determination of the lateral deflection the aforesaid ball carrier $B^6$ adjustable in accordance with $S_T \times \operatorname{cosec} S_p$ is connected to another ball carrier $C^2$ which therefore moves in accordance with the same factor. The latter ball carrier form part of a calculating mechanism which also comprises a second ball carrier $C^3$, a roller $C^4$ with which the ball of the carrier $C^2$ engages, the aforesaid roller $C^1$ (rotated in accordance with $R_T$) with which the other ball engages, and a disc $C^5$ with which both the balls engage. The second ball carrier $C^3$ is adjusted in accordance with the factor (sec $S_p \times \cos S_f$) obtained by a suitable linkage which will be described later; therefore the speed of rotation of the disc $C^5$ is proportional to $R_t(\cos S_p \times \sec S_f)$. Since this speed varies as the speed of the roller $C^1$—the distance of the ball carrier $C^3$ from the axis of the disc, which equals $$\frac{Rt}{\sec S_p \times \cos S_f}$$

which in turn equals $R_t(\cos S_p \times \sec S_f)$. Consequently the first mentioned roller $C^4$ of this calculating mechanism rotates at a speed proportional to $R_t(S_T \times \operatorname{cosec} S_p) \times (\cos S_p \times \sec S_f)$, i. e. proportional to the lateral deflection. The latter roller is connected to a pointer $C^6$ by a differential gear $C^7$ which is also operated upon, in order to keep the pointer "balanced", by a roller $C^8$ forming part of a variable speed mechanism driven by the aforesaid constant speed motor. A ball carrier $D^1$ interposed between this roller and a disc $D^2$ driven by the motor is adjusted by the lateral deflection handle $D$ through a worm $D^3$, a worm wheel quadrant $D^4$ and a link $D^5$ so that the rotation of this handle $D$ in maintaining the pointer "balanced" is a measure of the lateral deflection which is indicated on a dial $D^\times$. The aforesaid linkage for obtaining the factor (sec $S_p \times \cos S_f$), comprises an arm $c^2$ angularly displaced in accordance with $S_f$ (the future angle of sight) from shafts $c^3$, $c^4$, $c^5$ the last-mentioned of which is operated through a differential gear $c^6$ from the aforesaid shaft $b^3$ moving in accordance with $S_p$ and a shaft $d^{\times\times}$ moving in accordance with the vertical deflection so that the shafts $c^3$, $c^4$, $c^5$ move in accordance with the algebraic sum of the present angle of sight and the vertical deflection, i. e. in accordance with the future angle of sight $S_f$. The said arm $c^2$ is associated with a member $c^7$ which is free to move bodily at right angles to a slidable member $c^8$ on which the aforesaid ball carrier $c^3$ is mounted. The members $c^7$ and $c^8$ are associated with a lever $c^9$ operated by a cam $c^{10}$ (driven by the aforesaid shaft $b^4$) in accordance with sec $S_p$ forming a linkage mechanism by which the member $c^8$ and therefore the ball carrier $C^3$ is displaced in accordance with sec $S_p \times \cos S_f$.

In an alternative construction the shafts operating the respective balanced pointers may be used to effect automatically the setting of the respective deflection ball carriers and thus obtain a state of balance and find the deflections without the necessity of hand setting. In this alternative construction the resultant obtained from the differential gear $B^{8\times}$ would be used for operating the shaft to which the handle $d$ is connected and thus automatically find a place of balance for the ball carrier $d^2$; the said shaft may be driven by electrical or mechanical amplifiers if necessary. Similarly the resultant obtained from the differential gear $C^7$ would be used for operating the shaft to which the handle $D$ is connected.

The vertical and lateral deflections may be added in any known or suitable manner to other components such as tangent elevation, wind corrections, muzzle velocity correction, "present" bearing angle, drift and spotting corrections, for the purpose of indicating or transmitting gun elevation and gun training angles to the guns or for both such purposes.

From the above description of Figure 1 it will be seen that the member $B^5$ is the one whose displacement in accordance with $S_T \times \operatorname{cosec} S_p$ is, according to the present invention, utilized in combination with the other factors involved to determine the vertical and lateral deflections. The movement of the aforesaid arm $B^4$ in accordance with $S_T$ is, in Figure 1, effected by a screw $E$ rotated by a shaft $E^1$, although other suitable means may be employed. $S_T$ is, as aforesaid, the product of sin $S_f$ and the time of flight, and is set on to the shaft $E_1$ by a definite setting of height added to a movement derived from the future angle of sight and height. The shaft $E_1$ is, in Figure 1, operated by a cam gear comprising a rotatable and axially adjustable cam $E^\times$ which is rotated from a shaft $c^{5\times}$ (operated by the aforesaid shaft $c^5$ moving in accordance with the factor $S_t$) and is moved axially in accordance with height of target by means of a screw $E^2$ operated by a knob $E^{2\times}$ which also operates the pointer of a dial $E^3$ indicating the height of target. A roller $E^4$ or the like in contact with the cam operates a rack member $E^5$ in accordance with the difference between the movement required for $S_T$ and that derived from the height setting which is algebraically added to this factor by means of a differential gear $E^6$ to effect rotation of the shaft $E^1$ strictly in accordance with $S_T$. Alternatively the cam $E^\times$ could be moved axially in accordance with $S_f$ and rotated in accordance with height of target. In the alternative construction shown in Figure 2 the shaft $E^1$ is rotated by a handle $e$ which moves a pointer $e^1$ over a drum $e^2$ rotated by the shaft $c^{5\times}$ which moves in accordance with the factor $S_f$, this drum carrying a chart marked with height of target curves; these curves are easy to follow because at a given height the changes in $S_T$ for varying angles of sight are small.

The fuze settings are determined in Figure 1 by a cam $G$ rotated by a shaft $G^\times$ which is driven from the aforesaid shaft $c^{5\times}$ that rotates in accordance with $S_f$, and this cam is displaced axially by a screw-threaded shaft $G^{\times\times}$ driven from the aforesaid shaft $E^1$ that rotates in accordance with $S_T$. Alternatively the cam $G$ can be rotated in accordance with $S_T$ and displaced axially in accordance with $S_f$. The said cam operates a rack member $G^1$ geared to a pointer $G^2$ moving over a fuze dial $C^3$. Alternatively as shown in Figure 3 the major portion of the fuze setting is derived from a multiplying linkage which produces values of $C \times H \times \operatorname{cosec} S_f$ where $C$ is a constant, $H$ is the height of target, and $S_f$ is the future angle of sight. This linkage comprises a pivoted bar $H$ operated by a nut $H^1$ on a screw-threaded shaft $H^2$ which is rotated in accordance with H from a knob $H^3$ (the height being indicated on a dial $H^{3\times}$), a slider $H^4$ which is displaced in relation to the pivot of said bar by an amount proportional to cosec $S_f$ by means of a cam $H^5$ rotated from the aforesaid shaft $c^{5\times}$ which moves in accordance with $S_f$, and a resultant slider $H^6$ which operates one member of a differential gear $H^7$. A second member of this differential gear is operated from another cam $H^8$ (which is rotated in accordance with $S_t$) by a rack member and pinion; this cam is displaced axially by the screw $H^2$ that is driven from the knob $H^3$ in accordance with H and gives a movement proportional to the differences between the fuze setting and $C \times H \times \text{cosec } S_f$. The third or resultant member of this differential gear is therefore given a movement proportional to the fuze setting which is indicated on a dial $h$ by a pointer $h^1$ driven by the said third member. For transmitting the fuze setting to the guns, a second or "follower" pointer may be arranged on the said dial $h$, the latter pointer being operated by a handle connected to an electrical transmitter. The rotation of the knob $H^3$ of Figure 3 may also serve to obtain $S_T$ in a similar manner to that hereinbefore described with reference to the knob $E^{2\times}$ of Figure 1 and furthermore the device of Figure 3 can be used in Figure 1 when the latter is modified in order to obtain $S_T$ in accordance with Figure 2.

What we claim and desire to secure by Letters Patent of the United States is:—

1. In anti-aircraft fire-control apparatus of the kind constructed to derive the vertical and the lateral deflections from the equations $$\sin d = R_E \cdot (S_T \cdot \text{cosec } S_p)$$

and $$\sin D = R_t \cdot (S_T \text{ cosec } S_p) \cos S_p \sec S_f,$$

a member movable in accordance with $S_T$, and means for utilizing the displacement of said member for mechanically interpreting the highest common factor "$S_T \cdot \text{cosec } S_p$" of both said equations and utilizing the result in combination with the rest of the factors for determining the vertical and lateral deflections.

2. Apparatus as in claim 1, in which there is a height-setting device, said device being operationally connected to the member movable in accordance with $S_T$, and means for modifying the movement obtained from the height-setting device so as to produce movement of the $S_T$ member mathematically in accordance with $S_T$.

3. Apparatus as in claim 1, in which there is, for operating the member movable according to $S_T$, a mechanism comprising a cam, and means for giving the cam a rotary movement and an axial movement, one of these movements being in accordance with $S_f$ and the other in accordance with height; a height-setting device, a member operated by said cam, and a differential gear for combining the movement of the height-setting device and said member operated by said cam and displacing the said member movable in accordance with $S_T$ in accordance with the algebraic sum of said movements.

4. Apparatus as in claim 1, and including means for determining the fuze-settings, said means comprising mechanism including a device for producing a movement directly proportional to $C \cdot H \cdot \text{cosec } S_f$ as hereinabove defined; a second device for producing a movement directly proportional to the difference between the fuze-setting and $C \cdot H \cdot \text{cosec } S_f$; and a differential gear for combining both the said movements in such a way as to operate a member in accordance with the fuze-settings.

5. Apparatus as in claim 1, and including means for determining the fuze-settings, said means comprising mechanism including a device for producing a movement directly proportional to $C \cdot H \cdot \text{cosec } S_f$ as hereinabove defined; a second device for producing a movement directly proportional to the difference between the fuze-setting and $C \cdot H \cdot \text{cosec } S_f$; and a differential gear for combining both the said movements in such a way as to operate a member in accordance with the fuze-setting, the first mentioned device comprising a calculating-linkage which has one member movable in accordance with H and another in accordance with cosec $S_f$; the second-mentioned device including a cam axially displaceable in accordance with H and rotatable in accordance with $S_f$.

JOHN PERCIVAL WATSON.
SIMEON PARKER.